July 13, 1926.
W. G. HOUSKEEPER
IONIZATION MANOMETER
Filed April 26, 1921
1,592,364
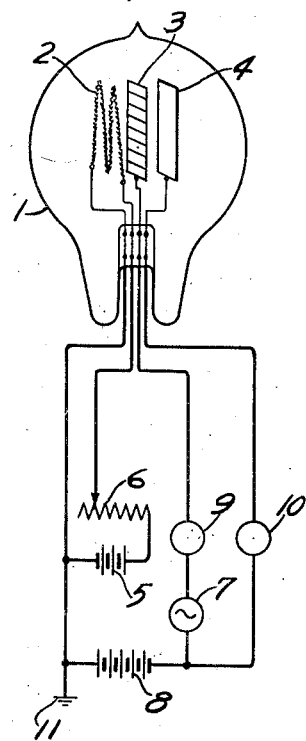
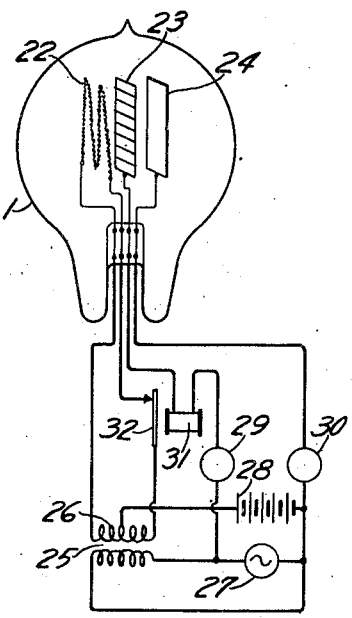
Inventor:
William G. Houskeeper
by W. E. Beatty Att'y.

Patented July 13, 1926.

1,592,364

UNITED STATES PATENT OFFICE.

WILLIAM G. HOUSKEEPER, OF NEW YORK, N. Y., ASSIGNOR TO WESTERN ELECTRIC COMPANY, INCORPORATED, OF NEW YORK, N. Y., A CORPORATION OF NEW YORK.

IONIZATION MANOMETER.

Application filed April 26, 1921. Serial No. 464,550.

This invention relates to a method of and apparatus for measuring gas pressures and more particularly for measuring exceedingly minute pressures such as are present in vacuum tubes used for electrical discharges of various characters.

In the copending application of O. E. Buckley, Patent No. 1,372,798, issued March 29, 1921, is disclosed a method of, and apparatus for measuring the gas pressure within an evacuated vessel, in which the measurements are not made of the pressure directly. Instead, a measurement is made of a characteristic of the gas which is variable according to the number of molecules present in the gas and from which the pressure may be calculated. An indication of the number of molecules contained within a given volume is determined through the medium of three electrodes within the containing vessel, the first of which electrodes is capable of acting as an electron source; the second of which electrodes is maintained at a steady potential positive with respect to the first electrode and the third electrode of which is maintained at a potential negative with respect to said first electrode. The first electrode is sufficiently energized to cause an electron emission therefrom and a high enough potential difference is applied between the first and second electrodes to cause the electrons to travel at a high velocity from said first electrode to said second electrode. The molecules present in the vessel will be ionized resulting in negative and positive ions, the latter of which will travel to the third electrode thereby producing a current in the circuit of which said electrode is an element. The amount of current in this circuit is an indication of the number of gas molecules present in the vessel and it may be utilized to calculate the pressure of said gas.

In order to measure the gas pressure within a vessel according to the above described method, it is necessary to widely separate the sealing-in points of the lead wires of the second and third electrodes, in order to prevent the leakage of current through the wall of the vessel from the lead wire of the second electrode to the lead wire of the third electrode. Unless such leakage is prevented the current flowing in the third electrode circuit is the sum of the leakage current and the current flowing due to the collection of positive ions on the third electrode. As it is impracticable to determine the magnitude of the leakage current, a correct indication of the current due to the collection of positive ions cannot be obtained. It is, however, highly desirable, in some instances, to measure pressure within a vessel in which the electrode lead wires are all sealed in the same press, as for example, when it is desired to measure the pressure within a complete vacuum tube utilizing the electrodes thereof, the lead wires for the electrodes being arranged in a press.

The object of this invention is a method and apparatus for testing the gas pressure within vacuum tubes of this character in which the effect of the leakage current between the lead wires in the press is nullified.

This object is attained by maintaining the third electrode at a negative potential with respect to the first electrode, maintaining the average potential difference between the second and third electrodes substantially zero, while rendering the second electrode positive at times with respect to the first electrode. In the apparatus for practising this method there is provided a source of alternating current, one side of which is connected to the second electrode and the other side to the third electrode. The first electrode is connected to the same side of the source of alternating current as is the third electrode and there is included between said first electrode and said source of alternating current means whereby the said first electrode is always maintained at a potential positive with respect to said third electrode. By virtue of this arrangement the direction of the leakage between the lead wires of the various electrodes is rapidly alternated so that it does not affect the measuring instrument arranged in the circuit of the third electrode for measuring current flowing in said circuit due to the collection by said third electrode of positive ions.

This invention will be better understood by having reference to the following specification and accompanying drawings wherein Fig. 1 discloses one embodiment of the invention and Fig. 2 discloses a modification thereof.

Referring first to Fig. 1, the vacuum tube 1, the gas pressure of which is to be measured, comprises the usual cathode 2, grid 3 and plate 4, the lead wires for which are closely grouped as in the stem of the tube. Connected between the terminals of the cathode 2 is a battery 5 and included in this circuit is a variable resistance 6. Between the grid 3 and the plate 4 is a source of alternating current 7. A battery 8 has its positive pole connected to the negative pole of the battery 5 and its negative pole to the same side of the source of alternating current 7 as is the plate 4. Interposed between the grid 3 and the alternating current source 7 is a direct current ammeter 9, by means of which may be determined the space current flowing from the cathode 2 to the grid 3. In the circuit of which the plate 4 is an element is provided a direct current micro-ammeter 10, by means of which may be measured current flowing in that circuit. The plate cathode circuit may be grounded as at 11.

Referring now to Fig. 2, the cathode 22 is connected with the source of alternating current 27 by means of the inductive coupling 25. A battery 28 has its negative pole connected with the lead for the plate 24 and its positive pole connected to the midpoint of the coil 26 of the coupling 25. The source of alternating current 27 has one side thereof connected to the negative pole of the battery 28. The grid 23 is connected to the opposite side of the source of alternating current 27. Included in the connection between the grid and the source of alternating current is the winding of the relay 31. The armature 32 of the relay 31 normally closes the cathode circuit. Arranged in the grid circuit is the direct current ammeter 29 and in the anode circuit is provided the direct current micro-ammeter 30.

In the operation of this device the cathode is energized and is caused to emit electrons which will be drawn to the grid electrode whenever the latter is at a positive potential with respect to the cathode. These electrons will collide with some of the gas molecules present in the vessel to ionize them resulting in negative and positive ions. During that period of the alternating current wave when the grid is positive with respect to the cathode, current will flow between the grid and filament producing positive ions, which will be collected by the plate. However, during that part of the alternating cycle when the grid is negative with respect to the cathode no current will flow and no positive ions will be produced and consequently there will be no collection of ions by the plate. Leakage current, however, will be flowing between the lead wires of the electrodes, the direction of the flow being rapidly alternated. The flow of this alternating current in the plate circuit will have no effect upon the micro-ammeter included therein since the inertia of the indicator is sufficiently large to be unaffected by slight rapidly alternating applications of force. The flow of current in the plate circuit due to the collection of positive ions will be intermittent but will always be in the same direction. This current will cause a deflection of the indicator of the micro-ammeter to indicate the magnitude of the current. The gas pressure within the tube may then be calculated.

In the modification disclosed in Fig. 1 the amount of the space current flowing between the cathode and grid may be varied by means of the resistance 6, whereas in Fig. 2 the relay 31 is so set that when the current flowing in the grid circuit exceeds a certain value the armature 32 is actuated thereby opening the cathode circuit. The opening of the cathode circuit causes a cessation of the electron emission from the cathode and a corresponding decrease in the current flowing in the grid cathode circuit. The relay 31 is therefore deenergized and the armature 32 moves back into position to close the cathode circuit, the cathode being again energized. By this means the space current flowing between the cathode and grid is maintained substantially constant. While the armature 32 of the relay 31 is shown as being included between the cathode and the secondary of the transformer, it is obvious that the same result would be obtained by arranging the armature between the primary of the transformer and the source of alternating current.

In the modification disclosed in Fig. 1 the battery 8 is of sufficient value to maintain the plate 4 at a potential negative with respect to the cathode 2. In Fig. 2 the battery 28 serves the same purpose by virtue of its connection with the mid-point of the coil 26 where the potential is maintained substantially constant.

Although the previous description has dealt more particularly with the measuring of gas pressure within a completed vacuum tube it is evident that the above described arrangement may be utilized to determine the degree of evacuation of a vessel being exhausted in the same general manner as is set forth in the above noted application of O. E. Buckley. Furthermore, while this arrangement is particularly adapted for measuring gas pressure in a vacuum tube in which the leads are arranged in a common press, it may however, be equally well used in the testing of vacuum tubes having a different arrangement of the lead wires.

What is claimed is:

1. In an apparatus for measuring pressure within an evacuated vessel having three electrodes of which the first is an electron source, means for energizing said first electrode, means for rendering said second electrode positive at times with respect to said first electrode, means for maintaining said third electrode at a constant negative potential with respect to said first electrode and means for maintaining the average potential difference between said second and third electrodes substantially zero.

2. In an apparatus for measuring pressure within an evacuated vessel having three electrodes of which the first is an electron source, means for energizing said first electrode, means for rendering said second electrode positive at times with respect to said first electrode, a battery for maintaining said third electrode at a constant negative potential with respect to said first electrode, means for maintaining the average potential difference between said second and third electrodes substantially zero and current indicating means in said third electrode circuit.

3. In an apparatus for measuring pressure within an evacuated vessel having three electrodes of which the first is an electron source, means for energizing said first electrode, means for rendering said second electrode positive at times with respect to said first electrode, means for maintaining said third electrode at a constant negative potential with respect to said first electrode, means for maintaining the average potential difference between said second electrode and said third electrode substantially zero and means for deenergizing said first electrode whenever the space current between it and the second electrode exceeds a predetermined value.

4. In an apparatus for measuring pressure within an evacuated vessel having three electrodes of which the first is an electron source, means for energizing said first electrode, connections from the second electrode to one side of a source of alternating current, connections from the third electrode to the opposite side of said source of alternating current, a battery, connections from the negative pole of said battery to said last named side of said alternating current source and connections from the positive pole of said battery to said first electrode.

5. In an apparatus for measuring pressure within an evacuated vessel having three electrodes of which the first is an electron source, means for alternately impressing positive and negative potentials on the second and third electrodes, means for energizing said first electrode, means for maintaining said third electrode at a negative potential with respect to said first electrode and a current indicating device in the third electrode circuit.

6. In an apparatus for measuring pressure within an evacuated vessel having three electrodes of which the first is an electron source, means for alternately impressing positive and negative potentials oppositely on said second and third electrodes, means for energizing said first electrode, means for maintaining said first electrode at a positive potential with respect to said third electrode and a current indicating device in the third electrode circuit.

7. In an apparatus for measuring pressure within an evacuated vessel having three electrodes of which the first is an electron source, a source of alternating current, means for inductively connecting said source of alternating current to said first electrode, connections between the second electrode and said alternating current source and between said third electrode and said alternating current source whereby positive and negative potentials are alternately impressed upon said electrodes, means for maintaining said third electrode at a negative potential with respect to said first electrode and a currrent indicating device in the third electrode circuit.

8. A method for measuring pressure within a vacuum tube having three electrodes of which the first is a source of electrons which comprises energizing said first electrode, rendering said second electrode positive at times with respect to said first electrode, maintaining said third electrode at a constant negative potential with respect to said first electrode, maintaining the average potential difference between said second and third electrodes substantially zero and measuring the resultant current flowing in the third electrode circuit.

9. A method for measuring pressure within a vacuum tube having three electrodes of which the first is an electron source which comprises alternately impressing positive and negative potentials on said second and third electrodes, energizing said first electrode, maintaining said third electrode at a negative potential with respect to said first electrode and measuring the resultant current in the third electrode circuit.

10. A method for measuring pressure within an evacuated vessel having three electrodes of which the first is an electron source which comprises alternately impressing positive and negative potentials oppositely on said second and third electrodes, energizing said first electrode, maintaining said first electrode at a potential positive with respect to said third electrode and measuring the current in said third electrode circuit.

11. In a device for measuring gas pressure within an evacuated vessel having a cathode, a source of current, circuit connections between said cathode and said source, an electrode, electrical connections between said electrode and said cathode and means in said electrical connection for regulating the current supply of the cathode circuit so that the space current between said cathode and said electrode does not exceed a predetermined value.

12. The method of determining gas pressure within a vessel which involves the establishment of an electron current between two electrodes within said vessel, maintaining a third electrode at a negative potential with respect to one of said electrodes and maintaining substantially zero the average potential difference between the other of said first two electrodes and said third electrode.

13. An apparatus for measuring gas pressure comprising an evacuated vessel, three electrodes within said vessel, means for applying between two of said electrodes an electron current of sufficient value to ionize the gas, means for maintaining substantially zero the average potential difference between one of said first two electrodes and the third electrode and means for measuring the current due to ionization of the gas.

14. An apparatus for measuring gas pressure comprising an evacuated vessel, three electrodes within said vessel, means for applying between two of said electrodes an electron current of sufficient value to ionize the gas, means for maintaining the third electrode at a negative potential with respect to one of said electrodes, means for maintaining substantially zero the average potential difference between the other of said first two electrodes and the third electrode and means for measuring the current due to ionization of the gas.

15. A method of measuring gas pressure within a vessel which comprises the establishment of an electron current between two electrodes within the vessel, maintaining the potential difference between one of said two electrodes and a third electrode in excess of a predetermined value, maintaining substantially zero the average potential difference between the other of said two electrodes and said third electrode and detecting the flow of positive ions to said third electrode.

16. An apparatus for measuring gas pressure comprising an evacuated vessel, three electrodes within said vessel, means for applying between two of said electrodes an electron current of sufficient value to ionize the gas, means for maintaining the potential difference between one of said two electrodes and the third electrode in excess of a predetermined value, means for maintaining substantially zero average potential difference between the other of said two electrodes and said third electrode and means for measuring the flow of positive ions to said third electrode.

17. An apparatus for measuring gas pressure comprising an evacuated vessel, three electrodes within said vessel, a source of alternating current, an inductive coupling between said alternating current source and one of said electrodes, a connection between one side of said alternating current source and a second of said electrodes, a connection between the opposite side of said alternating current source and the third electrode, a battery, a connection from the mid-point of the electrode side of said coupling to the positive pole of said battery, and a connection from the negative pole of said battery to said third electrode.

18. An apparatus for measuring gas pressure comprising an evacuated vessel, a filament within said vessel, a source of alternating current, an impedance element in series with said filament, a battery, a connection from the mid-point of said impedance to the positive pole of said battery, a second electrode, a connection from said second electrode to one side of said alternating current source, a third electrode and connection from said third electrode to the negative pole of said battery and the opposite side of said alternating current source, said alternating current source being inductively related to said filament.

19. An apparatus for measuring gas pressure within a three electrode vacuum tube having the lead wires for its electrodes sealed in a common press which comprises means for establishing an electron flow between two of said electrodes, means for impressing on the third electrode a negative potential with respect to one of said first two electrodes and means to nullify the effect of leakage current between the lead wires over one of said first two electrodes and said third electrode.

20. A method for measuring gas pressure within a three electrode vacuum tube having the lead wires for its electrodes sealed in a common press which comprises establishing an electron flow between two of said electrodes, maintaining the third electrode at a negative potential with respect to one of said first two electrodes, and nullifying the effect of leakage current between the lead wires of one of said first two electrodes and said third electrode.

21. A method for measuring gas pressure within a vacuum tube having electrodes which comprises establishing an electron flow between two of said electrodes, obtaining an indication of the ionization within the tube, and nullifying the effect of leakage current between lead wires of one of the two said electrodes and of another electrode.

22. An electron discharge device comprising a plurality of electrodes, leading in wires therefor, a source of voltage and means to compensate for leakage between the leading in wires of the grid and plate electrodes.

23. An electron discharge device comprising a plurality of electrodes, leading in wires therefor, a source of voltage and potential supplying means for compensating for leakage between the leading in wires of two of said electrodes.

24. An ionization manometer comprising an electron discharge device having electrodes, an indicating instrument connected thereto, a transformer connected to said device, and a connection from an intermediate point on the transformer winding to one of said electrodes.

25. An ionization manometer comprising an electron discharge device having an evacuated envelop having therein a filamentary cathode and auxiliary electrodes associated therewith, a source of alternating potential applied to said cathode for heating purposes, and a connection between one of said auxiliary electrodes and said source so arranged that the average potential difference between the cathode and said last-mentioned auxiliary electrode is substantially independent of the potential applied to the cathode for heating purposes.

26. An electron discharge device comprising a cathode and auxiliary electrodes associated therewith, a source of alternating current, a transformer for connecting said source to heat said cathode, and means connected to one of said auxiliary electrodes for controlling the connection of said transformer to said cathode.

27. An electron discharge device comprising a cathode and auxiliary electrodes associated therewith, a source of alternating current, a transformer for connecting said source to supply heating current to said cathode, a connection from an intermediate point of the secondary winding of said transformer to one of said auxiliary electrodes and electro-responsive means for controlling the cathode circuit.

28. An electron discharge device comprising a cathode and auxiliary electrodes associated therewith, a source of alternating current inductively connected with said cathode, and current responsive means connected to one of said auxiliary electrodes for opening the cathode circuit.

29. An electron discharge device comprising a cathode and auxiliary electrodes associated therewith, a source of alternating current inductively connected with said cathode, and current responsive means connected to one of said auxiliary electrodes for controlling the supply of heating current to the cathode.

In witness whereof, I hereunto subscribe my name this 22nd day of April A. D., 1921.

WILLIAM G. HOUSKEEPER.